3,592,644
THERMORECORDING AND REPRODUCTION OF
GRAPHIC INFORMATION
Marcel Nicolas Vrancken, Hove, and Daniel Alois Claeys
and Eric Maria Brinckman, Mortsel, Belgium, assignors
to Gevaert-Agfa N.V., Mortsel, Belgium
No Drawing. Filed Oct. 24, 1967, Ser. No. 677,751
Claims priority, application Great Britain, Oct. 24, 1966,
47,628/66
Int. Cl. G03c 5/04
U.S. Cl. 96—27     22 Claims

ABSTRACT OF THE DISCLOSURE

A recording layer of finely divided thermoplastic particles is imagewise heated to water-impermeability and a meltable material like a wax which melts below the temperature of water-impermeability of the thermoplastic particles and is either carried in the thermoplastic particle layer or in a layer under it is heated to melting and diffuses through the unheated areas of the thermoplastic particle layer to a receiving support.

---

The present invention relates to the recording and reproduction of information and in particular to multi-copying of documents.

In the U.S. patent application Ser. No. 550,834 corresponding with the published Dutch patent application 6606719 is claimed a method for recording information comprising the following features: a recording material is information-wise exposed to electro-magnetic radiation composed wholly or mainly of visible light; the said recording material comprises at least one recording layer, which incorporates hydrophobic thermoplastic polymeric material in the form of particles solid at room temperature and which contains or is in heat-conductive relationship with at least one substance which absorbs in the recording material at least some of the light that irradiates such material and consequently yields heat energy; and the intensity and duration of the light radiation with which said material is irradiated being such that in consequence of the said absorption of light and yield of heat energy in the recording material, a record is formed in terms of a difference in the water-permeability of different areas of said recording layer.

According to a special embodiment described in the said U.S. patent application and published Dutch patent application, the recording layer is carried by a sub-layer comprising a polymer, which can be softened by heating and wherein a transfer of material from said recording layer to a receiving material is achieved while the recording material is at a temperature such that a stratum of polymer from said sub-layer adheres to such transferred material.

There has now been found a method of recording and reproducing information comprising the following steps: a recording material as defined hereinafter is (1) recordwise or information-wise exposed to electro-magnetic radiation for a very short period of time preferably not greater than $10^{-1}$ second and of such intensity that in said recording material a record is formed in terms of a difference in liquid-permeability and (2) the exposed recording material with its thermo-sensitive surface recording layer is presesd in dry state against a receiving material while heating the recording material at a temperature below the temperature, at which substantial liquid-impermeabilization of the surface recording layer takes place, and (3) peeled apart therefrom, thus leaving on the receiving material a print of transferred substances of the recording material.

The said recording material comprises a support and a surface recording layer, which incorporates hydrophobic thermoplastic polymeric material in the form of particles solid at room temperature and in heat-conductive relationship with said polymer particles a substance or mixture of substances, which absorb at least some of the light that irradiates such material and converts absorbed light into heat energy. Further the said recording material comprises in the surface recording layer and/or in an interlayer adjacent thereto a meltable substance or mixture of such substances, preferably substances melting in the range of 35 to 90° C., which can be transferred to a receiving material by heating the recording material below the temperature at which the surface recording layer becomes liquid-impermeable, more particularly water-impermeable.

For reason of image-sharpness the meltable substances are preferably incorporated into the interlayer. When said substances are sufficiently film-forming, the whole interlayer can be composed of them.

It is not strictly necessary to use a hydrophilic binding agent in the surface recording layer since in dry state a relatively good adherence of the polymer particles (latex particles) can be obtained to each other and to the underlying interlayer or support, which may contain a subbing layer. It is supposed that the wetting or dispersing agent (0.2 to 30% by weight in respect of the polymer particles), which is always coated together with the polymer particles plays a part herein.

When containing a hydrophilic binding agent the surface recording layer should preferably contain said binding agent in a ratio by weight not greater than 1:1 in respect of the dispersed hydrophobic thermoplastic polymer particles, and the content in percent by volume of the recording layer of the dispersion of the said polymer particles in the said binding agent is preferably at least 50%.

When the recording layer contains no hydrophilic binding agent the content of hydrophobic thermoplastic polymer particles should preferably not be lower than 80% by weight.

The recording materials for use according to the present invention can be divided in three types according to whether the meltable transferable substance(s) are present in the recording layer, the interlayer, or in both of these layers.

Thus, a first type of recording material consists of a support, which is preferably coated with a subbing layer and a surface recording layer, which contains the hydrophobic thermoplastic polymer particles solid at room temperature (20° C.) either or not dispersed in a hydrophilic binder, and contains a meltable substance or a mixture of meltable substances that can be transferred by melting-out. The meltable substance may be inherently coloured but is preferably a colourless substance, which contains or dissolves in melted state a dye, colour reaction partner(s), or catalyst(s) for a colour reaction. In the case the surface recording layer contains a hydrophilic binder, the latter should be present in a ratio not greater than 1:1 by weight in respect of the polymer particles. The surface recording layer contains together with said polymer particles, substance(s) which are distributed in the polymer particles, between said particles and/ or in the hydrophilic binder if such one is present, and which absorb at least some of the light used in the exposure and convert absorbed light into heat.

A second type of recording material consists of a support which may be coated with a subbing layer, and a surface recording layer as described for the first type of recording material, which surface layer is applied to an interlayer. The interlayer contains or is composed of a said transferable meltable substance or mixture of meltable substances. Preferably the transferable meltable substance or mixture of meltable substances contains in dissolved state a dye, reaction partner(s) and/or catalyst(s) for a colour reaction.

A third type of recording material consists of a support, which may be coated with a subbing layer, an interlayer as in the second type of recording material, and a surface recording layer according to the first type of recording material but not containing a said transferable meltable substance or mixture of meltable substances.

A detailed survey of ingredients and their incorporation into the recording material used in the present invention is given hereinafter.

The hydrophobic thermoplastic polymer particles of the surface recording layer are applied from an aqueous dispersion (latex) containing a dispersing agent and occasionally a hydrophilic binding agent. The coating and drying of the surface layer proceeds at a temperature not substantially higher than room temperature. The polymer particles preferably soften between 10 and 200° C. above room temperature. As examples of suitable polymers may be cited polymers having a melting point or a glass-transition temperature between 10 and 200° C. above room temperature. Particularly suitable polymers are poly(ethylene) and poly(vinylidene chloride) having a melting point of 110 and 190° C. respectively, and the following polymers with their respective glass-transition temperature: polystyrene (100° C.), poly(methyl methacrylate) varying between 70 and 105° C.), poly(vinyl chloride) (near 70° C.,), poly(acrylonitrile) (near 100° C.), poly(N-vinyl carbazole) (200° C.), and polypropylene (130° C.).

Further particulars about suitable compositions containing hydrophobic thermoplastic polymer particles (latices) and their preparation can be found in the main patent application.

As hydrophilic binding agent for the heat-sensitive layer use can be made of hydrophilic natural colloids, modified hydrophilic natural colloids, and synthetic hydrophilic polymers.

Suited water-soluble binding agents are e.g. gelatin, glue, casein, zein, hydroxyethylcellulose, hydroxypropylcellulose, carboxymethylcellulose, methylcellulose, carboxymethylhydroxyethyl cellulose, starch derivatives such as hydroxyethylstarch and hydroxypropylstarch, sucrose octaacetate, ammonium alginate, and hydrophilic derivatives of such colloids. Synthetic hydrophilic polymers e.g., polyvinyl alcohol, poly (N-vinyl-pyrrolidone), poly(vinylamine), poly(ethylene oxide), polyacrylic acid, and hydrophilic copolymers and derivatives of such polymers.

In order to realize the transfer of the non-heated portions of the recording layer together with transferable meltable substances of the underlying layer, a softening agent for the hydrophilic binder is preferably present in the recording layer.

Molten substances suited for being transferred in molten state from the surface and/or interlayer to a receiving material, are preferably of a greasy or waxy consistency, e.g. the hydrophobic waxes and waxlike substances described in the published Dutch patent application 6704687, wherein those having a melting point below 90° C. are preferred. Suitable waxlike compounds are e.g. beeswax, candellila wax, carnauba wax, japan wax, montan wax, paraffin wax, petrolatum, paraffin oil, lanoline, dimethylglycol phthalate, sulphonated castor oil, oleic acid, poly(vinyl stearate), glycerolmonostearate, sucrose trilaurate, sucrosedistearate-palmitate, sorbitol monopalmitate, sorbitol tristearate, sorbitol dodecanate, polyethylene sebacate, polyhexamethylene adipate, and the monoethanolamide of castor oil.

The transferable substances need not be solid at room temperature since liquid high-viscosity compounds, the viscosity of which is reduced by heating, can be used too e.g. castor oil. The transferable substances need not be hydrophobic. So, use can also be made of hydrophilic waxy substances, among which the oxyethylene polymers of relatively high molecular weight (average molecular weight above 4000, melting point 50–60° C.) are preferred. In molten state these oxyethylene polymers are a solvent for several hydrophilic colloids present as binder in the surface recording layer e.g. casein, zein, methylcellulose, poly(N-vinyl pyrrolidone), sucrose-octaacetate, poly(ethylene oxide), and hydroxypropylcellulose.

The transferable substance may be mixed with a softening agent or liquid substance (oil) to lower the melting point and the melt-viscosity, and to improve the transfer by heating.

Suitable binding agents for heat-transferable substances in the interlayer are gelatin, poly(N-vinyl pyrrolidone), poly(1,2 - dihydro - 2,2,4 - trimethylquinoline), poly(vinyl butyral), ethylcellulose, ethylcellulose phthalate, hydroxyethylcellulose acetate, sucrose-octaacetate, hydroxypropylcellulose, and ethylhydroxyethylcellulose. The content of binder in the interlayer preferably does not exceed 90% by weight. Special attention is drawn to copolyesters of sebacic acid, terephthalic acid, and ethylene glycol and to the polyesters of adipic acid and ethylene glycol, since the latter compounds are suited for use as binder and as melt-transferable compound (melting in the range from 40 to 90° C.).

The substance or mixture of substances for producing heat energy by absorbing electromagnetic radiation may be present in the recording layer in dissolved or particulate form. Finely divided black or dark coloured pigments or dyes are preferred. Such substance or mixture is preferably present in the surface recording layer, but may also be present in the interlayer, if any.

As light-absorbing substances for use in the recording layer, which coinvert light into heat, are particularly mentioned the following pigments: carbon black, graphite, oxides or sulphides of heavy metals having an atomic weight between 45 and 210, such as manganese or lead sulphide or these heavy metals themselves in finely divided state, e.g. silver, bismuth, lead, iron, cobalt, or nickel. For carrying out the invention preference is given to carbon black as light-absorbing material.

The heat-sensitive surface recording layer may comprise a concentration of said pigments yielding an optical density of 0.2 to 5. For obtaining such an high optical density, up to 30–50°% by weight of light-absorbing substances (pigments) in respect of hydrophobic thermoplastic polymer particles may be present in the surface recording layer.

For the recording of coloured originals the recording material may contain as light-absorbing substance a substance or mixture of substances, which absorbs a part of the visible spectrum and converts that light into heat. Preferably, a substance or substances, which absorb light of one of the primary colours (red, green, blue) or subtractive colours (cyan, magenta, yellow), is or are incorporated.

Substances, which absorb visible light of a part of the visible spectrum and wherein absorbed light energy is converted into heat, are e.g. dyes belonging to the classes of the azo-, triarylmethane-, xanthene-, acridine-, methine-, azine-, phthalocyanine-, anthraquinone, and allied dyes.

In a preferred embodiment of the present invention use is made of a recording material wherein in the transfer step by a moderate heating (at a temperature between 35 and 90° C.) the transferable substance melts and dissolves a dye or a dye-forming compound or composition.

For use in reflex exposure the recording material preferably has an optical density not exceeding 1.000 and more preferably an optical density comprised between 0.25 and 0.80. The said density is preferably substantially built up by the light absorbing substances converting in the surface recording layer absorbed light into heat.

In the case, however, the density of the copy obtained on the receiving material is wholly or partly formed by the pigments or dyes originally present in the recording material, a density of 0.25 to 1.00 of the recording layer is not intense enough to produce a sufficient amount of dense prints by repeated transfer.

Thus, according to a special embodiment for reflex exposure use in made of a recording material containing in the recording layer and/or interlayer colourless or subsubstantially colourless reaction partners, which yield a coloured product by heating, but the reactivity of which is sufficiently low to not substantially react with each other under the influence of the heat produced during the exposure and/or applied in the next transfer step. In that case the coloured reaction product is formed on the receiving material by additional heat supplied to the receiving material after the transfer of the meltable substance(s).

In this exposure technique the recording material should preferably contain a colourless melt-transferable composition consisting of or comprising one or more colourless reaction partners and/or catalysts for a colour reaction.

According to another embodiment in the case reflex exposure is applied, use can be made in the interlayer and/or surface recording layer of a heat-sensitive colourless compound or composition suitable for forming a coloured product with a reactive component present in the receiving material. The temperature, at which said coloured product is formed, may lie beneath or above the impermeabilization temperature of the surface recording layer, which impermeabilization temperature preferably varies between 80 and 150° C.

The density and the amount of copies, which can be produced by a repeated transfer, depends on the concentration of dye or colour reactant and the solubility of said dye or reactant in the meltable substance. In particular cases the dye(s) or colour reactant(s) and meltable substance(s) are but one compound. Thus, e.g., use can be made of low melting coloured compounds e.g. azobenzol or low melting reactants melting in the range from 35° to 90° C., e.g., mercuric erucate, which becomes reactive on heating and forms a coloured compound with a reducing compound, as is known from classical thermography.

Fat- or wax soluble dyes and pigments are particularly suitable for use according to the present invention. They belong to several different chemical classes. So may be used azo dyes containing no strongly acidic groups, nigrosines, indulines, complex metal salts of mordantable dyestuffs, triphenyl methane colours and various anthraquinone compounds. Suitable dyes are e.g. Sudan Orange G (C.I. 11,920), Suan, Brown BB (C.I. 12,020), Sudan Red BB (C.I. 26,105), Sudan Orange R (C.I. 12,055), Ceres Red 7B (C.I. 26,050), Ceres Red 5B (C.I. 26,125), Bleu Ciel au chrome solide B (C.I. 43,830), Crystal Violet (C.I. 42,555), Victoria blue base B (C.I. 44,045 B), Nigrosine base 51017 (C.I. 50,415 B), Methylene blue (C.I. 52,015), Sudan blue II (C.I. 2883), Sudan blue G (C.I. 61,525), Ceres blue GN (C.I. 61,520 and Indigo (C.I. 73,000). In this connection there must be mentioned that the polyoxyalkylene waxes are very good solvents for many dyes and/or colour forming compounds.

Suitable wax-soluble colour forming compounds are e.g. hydroquinone, p-methylaminophenol sulphate, p-phenylenediamine, pyrogallol, pyrocatechol, thioacetamide, thiourea, silver nitrate, ferrous sulphate, antipyrine, and resorcinol. They can be used in combination with coreactive components as mentioned e.g. in the published Dutch patent application 6708668.

For thermo-sensitive colour reactants having a reaction temperature beyond the impermeabilization temperature of the surface recording layer, reference is made to the thermal colour reactions described in "Chemie für Labor und Betrieb" (October 1962), Feigl-Fortschritte der Tüpfelanalyse, Table 7, page 416 and page 418.

In order to obtain sharp and smudge-free copies, the melt-transferable substance(s) is or are preferably provided in an interlayer adjacent to the surface recording layer.

The attention has to be drawn to the fact that a visible image on the receiving material need not necessarily be obtained by means of a colour reaction, since the transferred meltable substances have adhesive power for finely divided solid particles (powder). In that development technique the toners suitable for use in electrostatic or magnetic recording can be applied.

The heat-sensitive recording layer may be coated by conventional means such as by a roller coater, brush coater, spraying device, knife caoter, or by the use of airblade to control the thickness and distribution of the coating composition.

The surface recording layer preferably has a thickness of $0.1\mu$ to $20\mu$. The interlayer preferably has a thickness of $1\mu$ to $100\mu$.

According to the intended use the support of the recording material may be a rigid or a flexible member. Preferably, however, a flexible member, which makes possible a roller-processing of the material is used. For use in reflex exposure a transparent support such as a resin support e.g. cellulose ester, polyester, or polystyrene support, or glassine paper support is used, in other cases a common paper support e.g. a baryta-coated paper support is very satisfactory.

The support of the receiving material may be common paper, which is preferably slightly porous and hydrophilic. The support or a surface layer of the receiving material will contain the necessary reaction partner(s) or catalyst(s) for a colour reaction, when the recording material can provide the suitable reaction partner(s) during the melt-transfer.

In order to reduce during the heat-generating imagewise electromagnetic irradiation the lateral conduction of heat within the recording material, the exposure should be as short as possible. Preferably the exposure does not last more than $10^{-1}$ second. Optimal results are obtained with exposures of less than $10^{-2}$ seconds; e.g., between $10^{-2}$ and $10^{-5}$ seconds. Such brief exposure times imply the use of high-energy radiation sources. Preferably the intensity of the light incident upon the recording material is at least 0.1 watt. sec./sq. cm. If the recording material is exposed reflectographically, the light incident upon the recording material includes light first incident upon such material from the radiation source and light reflected onto such material from the original.

When using very brief exposure times, as above specified, sharp "images" can be obtained even if the recording layer, during the exposure, is in surface contact with the light-absorbing markings on the original, sincethe time is too short for the recording layer to be materially affected by heat-conduction from such markings. On the other hand, in the exposed or most exposed areas of the recording material, a sudden very intense heating in the recording material takes place.

Various types of flash lamps are ideally suitable sources of short duration light radiation, e.g. gas discharge lamps emitting light substantially in the wavelength range of $0.3\mu$ to $1\mu$. In commonly used flash lamps the radiation employed consists for at least 70% of electromagnetic radiation in the wavelength below 700 m$\mu$, but it is not our intention to exclude radiation sources emitting a high amount (more than 50%) of infra-red radiation.

According to the present invention good results are obtained with a xenon gas discharge lamp, which can supply an energy of 300–1000 watt. sec. in a period of $10^{-4}$ to $10^{-2}$ seconds.

According to a preferred embodiment of the exposure a gas discharge lamp is used in the form of a thin tube, which is fitted in a hollow glass cylinder in order to make possible a uniform exposure of the recording material applied together with the original for contact exposure to the periphery of the cylinder. For such an exposure technique reference is made to the main patent application. For materials having an optical density of at least 1, in consequence of the presence of said light absorbing substances converting light into heat, a light energy of 0.3 watt. sec. per sq. cm. will suffice in practice for obtaining useful image-wise impermeabilization of the surface recording layer. It is further self-explanatory that the exposure may be progressive and intermittent. In other words the heat-sensitive material may be scanned with an image-wise modulated light-spot of high intensity e.g. a laser beam, or may be progressively exposed through a slit wherein e.g. copying light of a continuously emitting tube-like radiation source is focused.

The exposure of the recording material may be carried out through a transparency or to an opaque original. For reason of image-sharpness the exposure is preferably a contact exposure.

Actual contact or a very close relationship of the original to be copied with the recording layer containing said light-absorbing substances is recommended as favouring the production of sharp images by melt-transfer.

During the transfer step heat is applied to the recording material e.g. by means of a hot roller, which at the same time serves as a pressure roller for pressing the recording material against the receiving material. For the development of a visible image by a thermal colour reaction, the receiving material can be subjected to an additional heat-treatment subsequent to the trannsfer step. This heat-treatment can be carried out by means of a hot roller or infra-red radiation source.

According to a special embodiment of copying, an image of transferred colourless meltable substance(s) is developed by means of a cloud of powder particles blown over the receiving material immediately after separation from the recording layer. As suitable powders so-called toners known from electrophotography and finely divided magnetizable metal particles either or not surrounded by a thermoplastic resin can be used.

According to the present invention and depending on the composition of the recording material 3 to 30 dry copies can be obtained by repeated transfer of substances by means of heat.

The following examples illustrate the present invention without, however, limiting it thereto. The hydroxypropyl-cellulose mentioned in the examples has a molecular substitution degrees (MS) of 3.71. A 5% aqueous solution thereof at 25° C. has a viscosity of 110 c.p.s.

Example 1

A glassine paper weighing 40 g. per sq. m. was coated pro rata of 15 sq. m. per kg. with a composition comprising:

Ethanol—92 ccs.
Hydroxypropylcellulose—5 g.
Ceres Blue GN (CI. 61,520—0.5 g.
Polyethylene glycol having an average molecular weight of 4,000—2.5 g.

The resulting layer was dried and then covered pro rata of 20 sq. m. per kg. with a surface layer having the following composition:

6% aqueous solution of gelatin—87 ccs.
Aqueous dispersion of carbon black containing 53 g. of carbon black, 23 g. of water, 10 g. of ethylene glycol, and 6 g. of nonylphenylpolyethylene oxide per 100 g. of dispersion—2 g.
40% aqueous emulsion of polyethylene having a particle size smaller than $0.1\mu$ and an average molecular weight between 15,000 and 30,000—100 ccs.
10% aqueous solution of the sodium salt of oleyl tauride (a surfactant)—20 ccs.
Water to 400 ccs.

After having been dried, the material was exposed for 1/125 sec. through a negative silver image transparency by an electronic flash with an energy output of 1.03 watt. sec. per sq. cm. The exposed material was then laid with its heat-sensitive layer on a paper sheet. The composite element was heated for 5 sec. to 75° C. After separation the paper sheet showed a blue print having the same image values as the transparency.

By repeating the latter steps and each time using a fresh paper sheet, approximately 6 prints were made from one master.

Example 2

A subbed polyethylene terephthalate film support was covered with a layer of the following composition pro rata of 13 sq. m. per kg.:

Methanol—20 ccs.
Hydroxypropylcellulose—3 g.
Polyethylene glycol having an average molecular weight of 6,000—1 g.
Methylene chloride—90 ccs.

The resulting dry material was coated with a surface layer in such a way that, after drying, the material possessed an optical density of 1.5 measured by transmission. The surface layer was composed of:

Water—131 ccs.
Aqueous dispersion of carbon black as described in Example 1—5 g.
Poly(N-vinyl pyrrolidone)—6 g.
40% aqueous emulsion of polyethylene as described in Example 1—50 ccs.
10% aqueous solution of the sodium salt of oleyl tauride—10 ccs.

After exposure of the material as described in Example 1, the coating side thereof was laid on a blank of common writing paper. The composite element was heated for 3 sec. to 85° C. After separation the paper blank showed a greyish black positive print.

By repeating the latter steps and each time using a fresh paper blank, approximately 5 similar prints were obtained.

Example 3

A subbed cellulose triacetate film was covered with a coating suspension consisting of:

Water—668 ccs.
Carbon black dispersion as described in Example 1—2 g.
40% aqueous polyethylene emulsion as described in Example 1—250 ccs.
Hydroxypropylcellulose—10 g.
Polyethylene glycol having an average molecular weight of 6,000—30 g.
10% aqueous solution of the sodium salt of oleyl tauride—50 ccs.

After drying, the material had an optical density of 0.5 as measured by transmission. The coated side of heat-sensitive material was laid on an original and the composite element was exposed reflectographically to flashlight with an energy output of 0.35 watt. sec. per sq. cm.

The exposed material was then placed on a blank of common paper and the composite element was heated for 5 sec. to 75° C. After separation, the paper blank showed a true and greyish black print.

By repeating the latter steps and each time using a fresh paper blank, 3 similar prints were obtained.

EXAMPLE 4

A polyethylene terephthalate film was coated pro rata of 13 sq. m. per. kg. with a coating composition consisting of Acetone—92 ccs.
Low molecular weight poly(vinyl butyral)—5 g.
Poly(ethyleneglycol) having an average molecular weight of 15,000—2.5 g.
Pyrogallol—0.5 g.

The resulting layer was dried and then coated with a surface layer as described in Example 1, in such a way that, after drying, the material had a density of 0.85, measured by transmission. After exposure as described in Example 1 the material was laid on a blank of common paper, which had been soaked previously with a 1% aqueous solution of iron (III) chloride and dried. The composite element was heated shortly to 75° C. After separation, the paper blank showed a purple-grey positive print.

By repeating the latter steps and each time taking a fresh paper blank, 4 more prints were made.

EXAMPLE 5

A subbed cellulose triacetate support was coated with a suspension comprising:

3% aqueous solution of gelatin—39 ccs.
Aqueous dispersion of carbon black as described in Example 1—1 g.
Hydroxypropylcellulose—10 g.
Water—85 ccs.
40% aqueous emulsion of polyethylene as described in Example 1—50 ccs.
Polyethylene glycol having an average molecular weight of 6,000—2.5 g.
10% aqueous solution of sodium tetradecylsulphate—10 ccs.

After drying, the material had a density of 0.85 as measured by transmission. The exposure was carried out in the same way as described in Example 1. Subsequently, the coated side of the material was laid on a blank of common paper and the composite element was exposed uniformly and reflectographically for 5 sec. to infrared radiation, thus causing the formation of a positive image of colourless molten substances on the paper. After separation of the material from the paper blank, the image of molten substances was made visible by powdering the paper with a resinous toner. The powder only adhered at the portions of the receiving material covered with transferred molten material. The surplus powder was removed by shaking. The visible image was then fixed by heating for a short while just above the melting point of the powder.

From 1 master approximately 7 similar prints could be made. A suitable development powder (toner) was composed as follows:

|  | G. |
|---|---|
| Pentaerythritol ester of colophony | 60 |
| Hydrogenated ester of colophony | 4 |
| Carbon black | 1 |
| Waxoline Nigrosine NS (made commercially available by I.C.I., Great Britain) (CI. 50,415B) | 10 |

These ingredients were mixed in dry condition and then melted. After cooling, they were ground finely in a ball mill.

EXAMPLE 6

A polyethylene terephthalate film was covered with a layer of the following composition pro rata of 15 sq. m. per kg.:

Acetone—92 ccs.
Sucrose-octaacetate—5 g.
Dimethylglycol phthalate—2.5 ccs.

The resulting dry material was coated with a covering layer as described in Example 1 in such a way that, after drying, the material possessed a density of 0.32, measured by transmission.

The material was then exposed and treated further as described in Example 5. From one master approximately three prints could be made.

EXAMPLE 7

A subbed cellulose triacetate film was coated with a suspension consisting of:

Water—37 ccs.
Hydroxypropylcellulose—1 g.
Aqueous carbon black dispersion as described in Example 1—0.2 g.
40% aqueous emulsion of polyethylene as described in Example 1—25 ccs.
Polyethylene glycol having an average molecular weight of 6,000—3 g.
10% aqueous solution of silver nitrate—30 ccs.
10% aqueous solution of the sodium salt of oleyl tauride—5 ccs.

The dried resulting material had a density of 0.48, measured by transmission. The material was then exposed as described in Example 1, and placed in contact, while heating, with a receiving paper prepared by coating a common paper support pro rata of 20 sq. m. per kg. with a dispersion comprising:

6% aqueous solution of gelatin—60 ccs.
Finely divided zinc sulphide—5 g.
Polyethylene glycol having an average molecular weight of 200—1 g.
Water—33.5 ccs.
20% aqueous solution of formaldehyde—0.5 ccs.

After separation, the receiving paper showed a brown positive print. Two more copies could be made by heating the master again, each time while in contact with a fresh receiving paper.

EXAMPLE 8

A subbed polyethylene terephthalate film was coated pro rata of 12 sq. m. per kg. with a solution comprising:

Acetone—89 ccs.
Sucrose-octaacetate—5 g.
Poly(ethylene glycol) having an average molecular weight of 10,000—3 g.
1-phenyl-3-pyrazolidinone—3 g.

The resulting material was then coated with a surface layer as described in Example 1, so that upon drying the material had a density of 0.46, measured by transmission. The material was exposed reflectographically, while in contact with an original, by means of a flashlamp with an energy output of 0.49 watt.sec. per sq. cm. and then heated for 3 seconds at 75° C. while in contact with a receiving paper, which had been coated previously with a fine dispersion prepared by grinding the following ingredients for 3 hours in a ball mill:

Silver behenate—5 g.
Poly(N-vinyl pyrrolidone)—3 g.
Methanol—192 ccs.

The receiving paper comprises approximately 0.75 g. of silver per sq. m.

After separation of the master from the receiving paper, the latter showed a brown positive print. By repeating the latter step, four similar prints could be made.

EXAMPLE 9

A subbed cellulose triacetate film was coated pro rata of 15 sq. m. per kg. with a composition comprising:

Ethanol—90 ccs.
Poly(1,2-dihydro-2,2,4-trimethylquinoline)—5 g.
Poly(ethylene glycol) with an average molecular weight of 6,000—3 g.

The resulting material was then coated with a covering layer as described in Example 1, so that upon drying the material had a density of 0.27, measured by transmission. The material was exposed as described in Example 8 and then heated for 3 seconds at 75° C. while in contact with a blank of common writing paper. After separation, the latent image on the paper blank was made visible by dusting with the powder described in Example 5.

Six prints could be made in the same way from one master.

EXAMPLE 10

A paper support weighing 80 g. per sq. m. was coated pro rata of 10 sq. m. per kg. with a solution comprising:

Hydroxypropylcellulose—3 g.
Poly(hexamethylene sebacate)—1 g.
Methylene chloride—90 ccs.
Methanol—10 ccs.

The resulting dry layer was then coated pro rata of 16 sq. m. per kg. with a surface layer from a composition consisting of:

Water—44 ccs.
6% aqueous solution of gelatin—25 ccs.
Aqueous dispersion of carbon black as described in Example 1—1 g.
40% aqueous emulsion of polyethylene as described in Example 1—25 ccs.
10% aqueous solution of the sodium salt of oleyl tauride—5 ccs.

After having been dried, the material was exposed as described in Example 1 and then heated for 5 seconds at 85° C. while in contact with a blank of common writing paper. After separation the paper blank showed a greyish black positive print. By repeating the latter steps, 4 similar prints could be made from one master.

EXAMPLE 11

A subbed cellulose triacetate film was coated pro rata of 12 sq. m. per kg. with a solution comprising:

Ethanol—66 ccs.
Water—22 ccs.
Sucrose-octaacetate—5 g.
Poly(ethylene glycol) with an average molecular weight of 6,000—3 g.
Ethylenediamine of ricinoleic acid—2 g.
3-pyrazolidinone hydrochloride—2 g.

The resulting dry layer was then coated with a surface layer as described in Example 1, so that upon drying the material had a density of 1.05, measured by transmission.

After having been dried, the material was exposed, as described in Example 1 and then heated for a short time to 50° C. while in contact with a receiving material composed of a paper support weighing 80 g. per. m., which had been coated with a suspension comprising:

Silver behenate—5 g.
Lithium metaborate octahydrate—1 g.
Poly(N-vinyl pyrrolidone)—3 g.
Methanol—192 ccs.

The receiving material comprised 1 g. of silver per sq. m. After separation from the master, the receiving material showed a brown-black positive relief print. By repeating the latter steps four similar prints could be made.

EXAMPLE 12

A subbed polyethylene terephthalate film support was coated pro rata of 15 sq. m. per kg. with a solution comprising:

Poly(ethylene glycol) with an average molecular weight of 6,000—5 g.
6% aqueous solution of gelatin—160 ccs.
20% aqueous solution of formaldehyde—1 cc.
Water—40 ccs.

The resulting dry layer was then coated with a covering layer composed of:

6% aqueous solution of gelatin—63.5 ccs.
Carbon black dispersion as described in Example 1—0.5 g.
40% aqueous emulsion of polyethylene as described in Example 1—50 ccs.
10% aqueous solution of sodium tetradecylsulfphate—10 ccs.
Water to 200 ccs.

The dried material had a density of 0.42, measured by transmission. The material was then exposed as described in Example 1 and laid with the surface recording layer side on a blank of common writing paper. The composite element was heated for 3 seconds to 75° C. After separation, a visible print was obtained on the paper blank by dusting it with a powder as described in Example 5. Seven prints were made in this way.

EXAMPLE 13

A subbed polyethylene terephthalate film was coated pro rata of 13 sq. m. per kg. with a solution comprising:

Poly(ethylene glycol) with an average molecular weight of 6,000—5 g.
Methylene chloride—183 ccs.
Hydroxyethylcellulose acetate (DS acetyl:2.80; hydroxyethyl: 0.92)—10 g.

The dry layer was then coated with a surface layer as described in Example 1 in such a way, that after drying, the resulting material had a density of 0.37 as measured by transparency. The material was then exposed and further treated as described in Example 5. Six black prints were made by repeated transfer in the same way.

EXAMPLE 14

A polyethylene terephthalate support having a thickness of 0.1 mm. was coated pro rata of 70 g. per sq. m. with the following mixture:

| | G. |
|---|---|
| Copolyester of ethylene glycol, sebacic acid (90 mole%), and terephthalic acid (10 mole%) | 20 |
| Polyisobutylene having an average molecular weight of 10,000 | 2 |
| Methyl violet | 5 |
| Methylene chloride | 200 |

The dried layer was then coated pro rata of 40 g. per sq. m. with a heat-sensitive layer composed of:

| | G. |
|---|---|
| 40% aqueous dispersion of polyethylene as described in Example 1 | 100 |
| Water | 500 |
| Aqueous carbon black dispersion containing per 100 g.: 53 g. of carbon black, 23 g. of water, 18 g. of ethylene glycol, and 6 g. of nonylphenylpolyethylene oxide | 10 |
| 5% aqueous solution of sodium tetradecyl sulfate | 25 |

After drying, the material was contact-exposed by means of a xenon gas discharge lamp with an energy output of 800 watt. sec. through a positive transparent original, the image-markings thereof facing the heat-sensitive surface layer.

The heat-sensitive layer was then placed in contact with a receiving paper. Both materials were conductive through a thermographic copying machine "Eichner" at setting 2, the reeciving paper facing the infrared radiation source. "Eichner" is a trade name of Eichner Dry Copy, Frankfurt am Main, Germany, for a thermographic copying machine. A legible purple print in accordance with the original was formed on the receiving paper. Approximately 30 prints could be made in this way from one master.

EXAMPLE 15

A polyethylene terephthalate support having a thickness of 0.1 mm. was coated pro rata of 60 g. per sq. m. with a dispersion comprising:

| | G. |
|---|---|
| Poly(hexamethylene adipate) | 20 |
| 25% alcoholic solution of gallic acid | 40 |
| Iron (III) stearate | 10 |
| Polyisobutylene (average molecular weight 150,000) | 4 |
| Methylene chloride | 300 |

The dried layer was then coated pro rata of 40 g. per sq. m. with a heat-sensitive layer composed of:

| | G. |
|---|---|
| 40% aqueous dispersion of polyethylene as described in Example 1 | 100 |
| Water | 500 |
| 53% aqueous carbon black dispersion as described in Example 14 | 5 |
| 5% aqueous solution of sodium tetradecyl sulfate | 25 |

After drying, the material was exposed reflectographically, the heat-sensitive layer being held in contact with the image markings of a paper original. The exposure was carried out by means of a xenon gas discharge lamp with an energy output of 0.8 watt.sec. per sq. cm. The exposed material held in contact with a reeciving paper was then led through a thermographic copying machine "Eichner" at setting 2, the receiving paper facing the infrared radiation source. In accordance with the areas of the recording layer not struck by reflected light, portions of the interlayer were transferred to the receiving paper When passing the receiving paper between rollers heated to 120° C., the transferred portions comprising iron (III) stearate and gallic acid turned black. Thus, a stable positive legible copy was obtained from the original. By repeating the later steps approximately 20 prints could be made from one master.

We claim:

1. A method of reproducing information comprising the steps of:
    (a) exposing to an image according to said information of electromagnetic radiation composed mainly of visible light, a recording material having a surface recording layer comprised of finely divided particles of a normally solid hydrophobic thermoplastic polymer obtained as the residue of an aqueous dispersion of said polymer and in heat-conductive relation with said polymer particles a finely divided pigment and/or dye capable of absorbing said light radiation and converting the same into heat, said recording layer becoming substantially water-impermeable when heated to a sufficient temperature, said recording material also including in said surface layer and/or in an underlying layer adjacent thereto a meltable substance having a melting point below the temperature producing substantial water-impermeability in said layer which is adapted to be transferred when melted onto a recording material in contacting relation with said surface layer, said exposure being for a time not exceeding $10^{-1}$ second and an intensity sufficient to heat said recording layer to a temperature sufficient to render it substantially water-impermeable,
    (b) contacting the surface layer of said exposed recording material in the dry state with a receiving material while heating to a temperature below the temperature producing substantial water-impermeability in said surface layer but sufficient to melt said meltable substance and effect transfer of at least a portion thereof onto said receiving material,
    (c) separating the materials after step (c), said receiving material on separation carrying thereon an image of said transferred meltable substance corresponding to the unexposed areas of said recording material, and
    (d) repeating said steps (b) and (c) with a plurality of fresh receiving materials to produce a multiplicity of reproductions of said information.

2. A method according to claim 1, wherein the recording material is image-wise exposed for a period of between $10^{-2}$ and $10^{-5}$ sec.

3. A method according to claim 2, wherein a flashlamp is used as said radiation.

4. A method according to claim 1, wherein the intensity of the exposing radiation is at least 0.1 watt.sec. per sq. cm.

5. A method according to claim 1, wherein the surface recording layer is superposed upon said underlayer, which is composed of said meltable substance or substances.

6. A method according to claim 1, wherein the surface recording layer contains the said thermoplastic polymer particles dispersed in a hydrophilic binder in a ratio in excess of 1:1 by weight.

7. A method according to claim 6, wherein the polymer particles and hydrophilic binder are present in the recording layer in a weight ratio of at least 3:2.

8. A method according to claim 7, wherein the hydrophilic binder is gelatin, poly(N-vinyl-pyrrolidone) or hydroxypropylcellulose.

9. A method according to claim 6, wherein said polymer particles are polyethylene particles.

10. A method according to claim 6, wherein the surface recording layer contains black or dark coloured light-absorbing substances converting absorbed light into heat.

11. A method according to claim 10, wherein the surface recording layer contains carbon black particles.

12. A method according to claim 1, wherein the recording material is image-wise irradiated with light composed substantially entirely of light waves of a wavelength of less than 700 mµ.

13. A method according to claim 1, wherein the recording material is reflectographically exposed to a sheet bearing a visible image and the recording material has an optical density not exceeding 1.00.

14. A method according to claim 2, wherein the original is in contact with the surface recording layer during the exposure.

15. A method according to claim 1, wherein as meltable substance suitable for transfer by melting out a substantially colourless substance is used.

16. A method according to claim 15, wherein in combination with said meltable substance the recording material contains a compound adapted to form a visible image when transferred to said receiving material.

17. A method according to claim 15, wherein in combination with said meltable substance substantially colourless reaction partners for a thermal colour reaction are used, which after transfer to a receiving sheet are additionally heated to form a coloured product thereon.

18. A method according to claim 15, wherein in combination with said meltable substance a substantially colourless reaction partner for a colour reaction is used which forms on transfer by heating with a reaction partner contained in the receiving material a coloured reaction product.

19. A method according to claim 6, wherein the interlayer contains a meltable substance, which in molten state is a solvent for the hydrophilic binder present in the surface recording layer.

20. A method according to claim 1, wherein the transferable meltable substance is a waxlike substance having a melting point below 90° C.

21. A method according to claim 20, wherein said meltable substance is selected from the group of an oxyethylene polymer, a copolyester of sebacic acid, terephthalic acid and ethylene glycol, or a polyester of adipic acid and ethylene glycol.

22. A method according to claim 1, wherein the image of said transferred substance is selectively covered with powder.

References Cited

UNITED STATES PATENTS

| | | | |
|---|---|---|---|
| 2,090,450 | 8/1937 | Kogel | 96—27X |
| 3,230,875 | 1/1966 | Newman | 117—36.4X |
| 3,298,833 | 1/1967 | Gaynor | 96—27 |
| 3,418,149 | 12/1968 | Newman | 117—36.1X |
| 3,459,581 | 8/1969 | Newman | 117—36.1 |

OTHER REFERENCES

Van der Grinter Bulletin, "Thermographic Writing and Copying Methods and Materials," No. 68, Aug. 1, 1963, pp. 1–6.

GEORGE F. LESMES, Primary Examiner

R. E. MARTIN, Assistant Examiner

U.S. Cl. X.R.

250—65.1; 117—36.1, 36.2, 36.4; 101—469, 470, 471